(12) United States Patent
Kumar et al.

(10) Patent No.: US 10,650,505 B2
(45) Date of Patent: May 12, 2020

(54) METHOD AND SYSTEM FOR GENERATING HIGH RESOLUTION IMAGE BY FUSING LOW RESOLUTION IMAGES

(71) Applicant: Tata Consultancy Services Limited, Mumbai (IN)

(72) Inventors: Achanna Anil Kumar, Bengaluru (IN); Narendra N, Bengaluru (IN); M Girish Chandra, Bengaluru (IN); Balamuralidhar P, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 109 days.

(21) Appl. No.: 15/934,872

(22) Filed: Mar. 23, 2018

(65) Prior Publication Data

US 2019/0019279 A1 Jan. 17, 2019

(30) Foreign Application Priority Data

Jul. 12, 2017 (IN) .............................. 201721024661

(51) Int. Cl.
*G06T 5/50* (2006.01)
*G06T 7/33* (2017.01)
*G06T 3/40* (2006.01)

(52) U.S. Cl.
CPC .............. *G06T 5/50* (2013.01); *G06T 3/4069* (2013.01); *G06T 7/337* (2017.01); *G06T 2207/20221* (2013.01)

(58) Field of Classification Search
CPC ......... G06T 5/50; G06T 3/4069; G06T 7/337; G06T 2207/20221

USPC ....... 382/254, 118, 203, 132, 284, 240, 299, 382/263, 266, 309; 375/240, 12, 240.25, 375/E7.09, E7.211, E7.186, E7.15, 375/E7.161, E7.04, E7.092; 716/52; 700/97, 121, 120
See application file for complete search history.

(56) References Cited

U.S. PATENT DOCUMENTS

| 8,878,950 B2 * | 11/2014 | Lelescu | G06T 3/4076 |
| | | | 348/218.1 |
| 10,074,158 B2 * | 9/2018 | Siddiqui | H04N 13/239 |
| 10,134,111 B2 * | 11/2018 | McLaughlin | G06T 3/4069 |

(Continued)

OTHER PUBLICATIONS

Krieger, J.D. et al. (Jan. 2014). "Multi-Coset Sparse Imaging Arrays," *IEEE Transactions on Antennas and Propagation*, vol. 62, No. 4; pp. 1-14.

*Primary Examiner* — Sheela C Chawan
(74) *Attorney, Agent, or Firm* — Finnegan, Henderson, Farabow, Garrett & Dunner LLP

(57) ABSTRACT

This disclosure relates generally to image processing, and more particularly to generate a high resolution image from multiple low resolution images. In an embodiment, the system collects a plurality of low resolution images as input, processes the collected images, and generates a high resolution image as output. During this process, the system pre-processes the collected low resolution images, and during this process, at least one characteristic of each of the low resolution image is changed with respect to a reference image. After the pre-processing stage, the images are then enhanced based on a plurality of final enhancement factors that are dynamically determined. Further, the enhanced images are fused to generate the high resolution image.

9 Claims, 3 Drawing Sheets

(56) References Cited

U.S. PATENT DOCUMENTS

2008/0298639 A1* 12/2008 Tsunekawa ........... G06T 3/4007
                                                                382/107
2010/0026839 A1    2/2010 Border et al.
2016/0350893 A1* 12/2016 Fletcher ................ G06T 3/0081
2017/0255942 A1*  9/2017 Chandrasekaran .. G06Q 20/202

* cited by examiner

METHOD AND SYSTEM FOR GENERATING HIGH RESOLUTION IMAGE BY FUSING LOW RESOLUTION IMAGES

PRIORITY CLAIM

This U.S. patent application claims priority under 35 U.S.C. § 119 to: India Application No. 201721024661, filed on Dec. 7, 2017. The entire contents of the aforementioned application are incorporated herein by reference.

TECHNICAL FIELD

This disclosure relates generally to image processing, and more particularly to generate a high resolution image from multiple low resolution images.

BACKGROUND

Be it industry level photography, or personal/professional level photography, image processing has become a necessity. Image processing is done so as to manipulate an image to change one or more characteristics of the image as per requirements, wherein the image processing can be done to enhance or diminish quality of the image by varying the one or more characteristics.

Image enhancement is required when quality of the image is to be improved to a desired level. Resolution of an image is a parameter that has direct impact on the quality of image. A low resolution image is of low quality and a high resolution image is of high quality. Low resolution images lack clarity thus making them not suitable for many applications.

The inventors here have recognized several technical problems with such conventional systems, as explained below. Super resolution techniques allow processing of low resolution images to generate high resolution images. The existing image processing systems are static in nature in terms of selection of enhancement factor for image processing, and the static enhancement factor may not be suitable for all low resolution images, depending on their characteristics. This makes an image processing system not suitable for processing certain images.

SUMMARY

Embodiments of the present disclosure present technological improvements as solutions to one or more of the above-mentioned technical problems recognized by the inventors in conventional systems. For example, in one embodiment, a processor-implemented method for image processing is provided. The method comprising collecting, via one or more hardware processors, a plurality of low resolution images as input, by an image processing system; pre-processing the plurality of low resolution images, via the one or more hardware processors, by the image processing system, wherein the pre-processing comprises of changing at least one characteristic of each of the plurality of low resolution images with respect to at least one reference image; enhancing the pre-processed low resolution images based on a plurality of final enhancement factors, via the one or more hardware processors, by the image processing system, wherein the plurality of final enhancement factors are dynamically determined for the plurality of low resolution images; and fusing the plurality of low resolution images to generate a high resolution image, after the enhancement, by the image processing system.

In another embodiment, an image processing system is provided. The system comprises of a processor, and a memory module comprising a plurality of instructions, the plurality of instructions are configured to cause the processor to collect, via one or more hardware processors, a plurality of low resolution images as input, by an Input/Output (I/O) module of the image processing system; pre-process the plurality of low resolution images, via the one or more hardware processors, by an image pre-processing module of the image processing system, wherein the pre-processing comprises of changing at least one characteristic of each of the plurality of low resolution images with respect to at least one reference image; enhance the pre-processed low resolution images based on a plurality of final enhancement factors, via the one or more hardware processors, by an enhancement the image processing system, wherein the plurality of final enhancement factors are dynamically determined for the plurality of low resolution images, by an enhancement factor selection module of the image processing system; and fuse the plurality of low resolution images to generate a high resolution image, after the enhancement, by the image processing system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
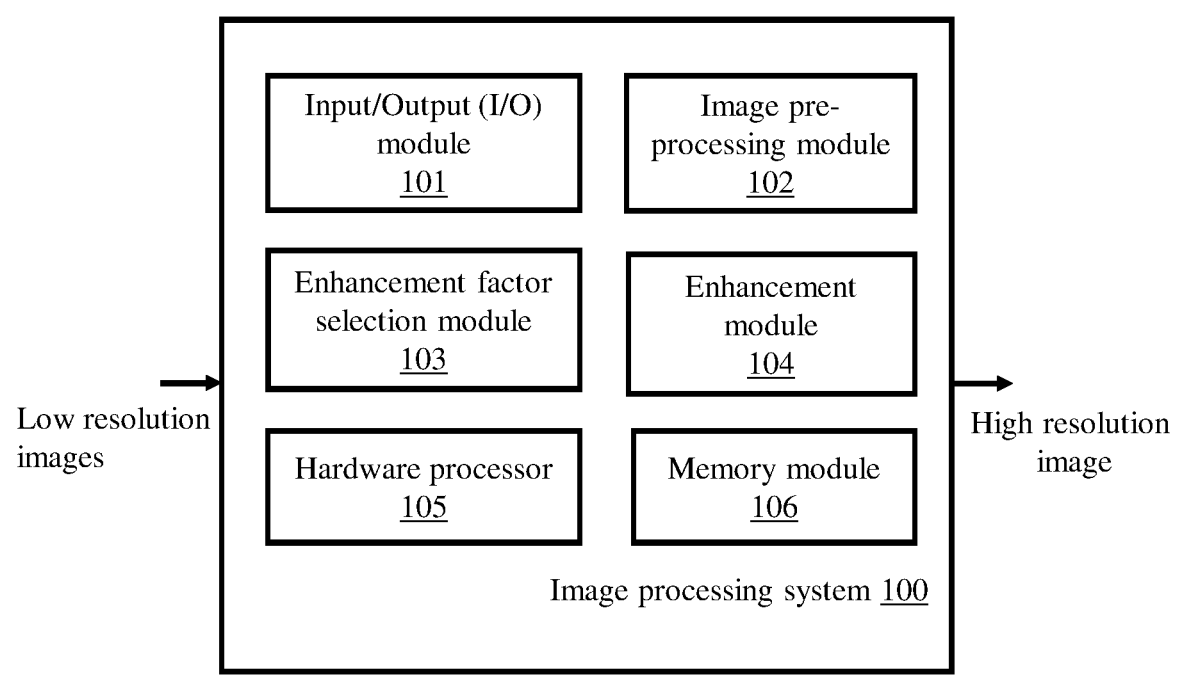
FIG. 1 illustrates an exemplary block diagram of an image processing system according to some embodiments of the present disclosure.

FIG. 1 illustrates a block diagram of an image processing system, according to some embodiments of the present disclosure. The image processing system 100 includes an Input/Output (I/O) module 101, an image pre-processing module 102, an enhancement factor selection module 103, an enhancement module 104, a hardware processor 105, and a memory module 106. In an embodiment, the image processing system 100 as depicted in FIG. 1 is for illustration purpose only, and the components and number of each component of the image processing system 100 can vary as per implementation standards/requirements and/or other related factors.

The Input/Output (I/O) module 101 is configured provide at least a channel for facilitating communication between the image processing system 100 and at least one external entity. The external entity can be a user and/or a system. For example, the I/O module 101 can provide a suitable interface for a user to directly interact with the image processing system 100 to provide input and/or to access output and/or to perform one or more action(s) related to the image processing being carried out by the image processing system 100. In another example, the I/O module 101 can be configured to provide at least one channel with suitable communication protocol(s) to facilitate communication between the image processing system 100 and the external entity, for data transfer. The I/O module 101, by interacting with the at least one external entity, collects a plurality of low resolution images which need to be processed for generating a high resolution image, as input. In an embodiment, from the image processing system's perspective, the term 'low resolution image' can refer to an image having resolution below a pre-specified threshold value of resolution. The external system referred herein can be a camera or an array of low resolution cameras, which can be configured to capture the images (low resolution) that are to be processed to generate the high resolution image output.

The image pre-processing module 102 is configured to collect and the process the low resolution images. In the pre-processing stage, the image pre-processing module 102 initially selects at least one image out of the collected low resolution images as a reference image. In an embodiment, the image pre-processing module 102 selects the image to be used as the reference image, based on at least one condition that is statically or dynamically configured with the image pre-processing module 102. For example, the condition can be that out of the low resolution images received as input, select the image which is more aligned to X-axis and/or Y-axis of a plane in which the image is located. In another embodiment, the image pre-processing module 102 selects a random image out of the low resolution images received as input, as the reference image. The image pre-processing module 102 further processes remaining images with respect to the reference image, and changes one or more characteristics of the images being processed so as to align with that of the reference image. Various examples of the characteristics being changed include, but not limited to position/alignment, size, and pixel level shift (all with respect to at least one reference image). In an embodiment, the image pre-processing module 102 performs translation estimation, and at least one of a rotation estimation, and a scaling estimation, as part of the pre-processing of the images, so as to change the characteristics, as needed. While the translation estimation is always done as part of the pre-processing of the images, the rotation estimation and/or the scaling estimation is done as per requirement. The rotation estimation involves estimation of rotation of each of the low resolution images with respect to the reference image, and then rotating back the images to align with the reference image, by calculating a rotation matrix. The rotation estimation further involves estimation of rotation by comparing the input image with a reference image, using any suitable technique, and thus find matching features between the reference and input images. For example, Speeded-Up Robust Features (SURF) technique can be used for finding one or more matching features.

In the scaling estimation process, out of all low resolution images being processed, one image with the highest resolution is identified and selected first. Further, other low resolution images are scaled to match the resolution of the selected image. Any suitable technique same as or similar to SURF can be used to compare the images with the reference image and determine scaling that needs to be done for each image. This is done to ensure that all images have the same resolution before fusing them to generate the high resolution image. The translation estimation can involve a coarse estimation and fine estimation. In coarse estimation, pixel level shift of each image with respect to the reference image is estimated by using any standard technique (for example "shift and compare" technique) at a low resolution scale. Further, only a common area between the image and the reference image is selected. In the fine estimation, a sub-pixel level shift is estimated, using any suitable known technique.

The enhancement factor selection module 103 collects the pre-processed images, and for the collected images, dynamically determines an enhancement factor. In this process, the enhancement factor selection module 103 selects an initial value of enhancement factor first. The enhancement factor selection module 103 may select any prime number as the initial value of enhancement factor. In an embodiment, the initial value of enhancement factor is selected as a prime number closer to 5 times value of total number of low resolution images being processed to generate the high resolution image. For instance, if total number of low resolution images is 10, then the enhancement factor is a prime number closer to 5*10=50. For example, the value is 53 (along both axes). This criteria can be changed according to requirements. After selecting the initial value of enhancement factor, the enhancement factor selection module 103 determines for the selected initial value of enhancement factor, sub-pixel shifts (along two axes: X axis and Y axis). Further, based on the determined sub-pixel shift, generates final enhancement factors ($L_x$ and $L_y$). Here Lx is the enhancement factor along the X axis, and Ly is the enhancement factor along the Y axis. The final enhancement factors are then used to enhance resolution of the images to an optimum resolution, wherein the resolution that amounts to 'optimum resolution' is pre-defined or dynamically defined or can vary based on user requirements. The enhancement factor selection module 103 further provides the determined final enhancement factors as input to the enhancement module 104.

The enhancement module 104 is configured to collect the pre-processed low resolution images and corresponding final enhancement factors as inputs. The enhancement module 104 then enhances the collected images, based on the final enhancement factors, so as to improve resolution of the images to match an optimum resolution. The enhancement module 104 fuses the images to generate a high resolution image. In an embodiment, the enhancement module 104 uses a multi-coset framework so as to fuse the images and generate the high-resolution image.

The hardware processor(s) 105 can be configured to interact with other components of the image processing module 100, and perform one or more actions with respect to the image processing technique, as instructed by the component/module the hardware processor 105 is interacting with. The hardware processor 105 can be of any suitable type, which matches data processing and data transfer requirements of the image processing system 100.

The memory module 106 is configured to store any data associated with the image processing being handled by the image processing system 100. The memory module 106 can be configured to store different types of data as part of the image processing, temporarily and/or permanently. The memory module 106 can be further configured to provide access to the stored data for any other component of the image processing system 100 and/or to one or more external entities, preferably after verifying authenticity of a data access request received.

Figure 2:
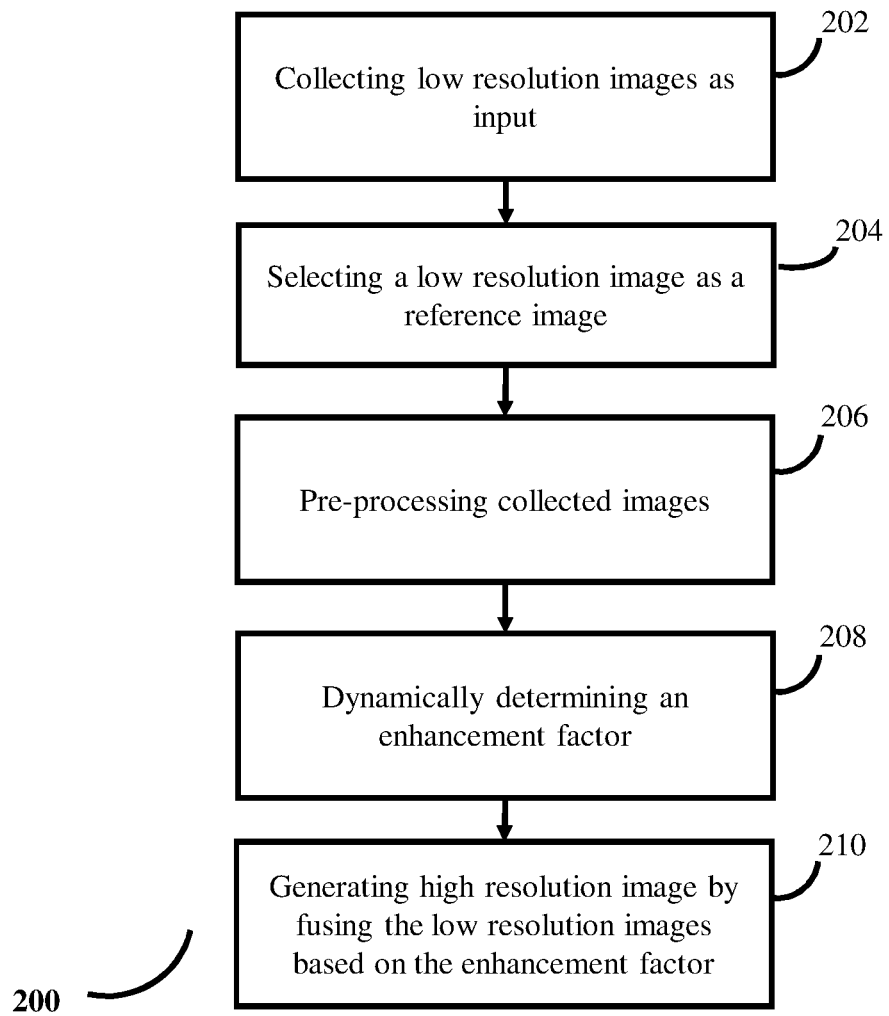
FIG. 2 is a flow diagram illustrating steps involved in the process of generating a high resolution image by fusing multiple low resolution images, by the image processing system, according to some embodiments of the present disclosure.

FIG. 2 is a flow diagram illustrating steps involved in the process of generating a high resolution image by fusing multiple low resolution images, in accordance with some embodiments of the present disclosure. The image processing described herein is used to generate a high resolution image from a plurality of low resolution images. This image processing starts by collecting (202) a plurality of low resolution images as input by an image processing system 100. Further, out of the low resolution images selected, one image is selected (204) as a reference image, by the image processing system 100. Further, the collected low resolution images are pre-processed (206) by the image processing system 100, wherein the pre-processing involves changing one or more characteristics of the images with respect to that of the reference image.

Once the pre-processing is done, then the image processing system 100 dynamically determines an enhancement factor for the set of low resolution images being processed. The pre-processed images are processed further, based on the enhancement factor, to generate a high resolution image. Various actions in FIG. 2 can be performed in the same order or in a different order. Further, or one or more of the actions in method 200 can be omitted.

Figure 3:
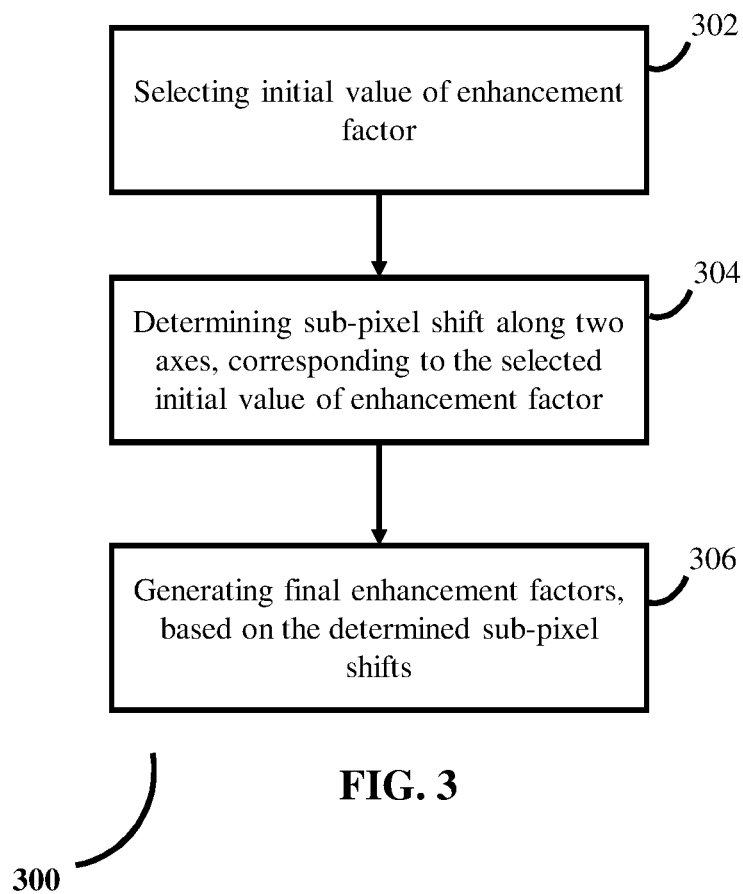
FIG. 3 is a flow diagram illustrating steps involved in the process of dynamically determining enhancement factor, by the image processing system, in accordance with some embodiments of the present disclosure.

FIG. 3 is a flow diagram illustrating steps involved in the process of dynamically determining enhancement factor, by the image processing system, in accordance with some embodiments of the present disclosure. This process starts by selecting (302) an initial value of enhancement factor by the enhancement factor selection module 103. A prime number may be selected as the initial value of enhancement factor. In various other embodiments, the selection of prime number can be a random selection or may be based on certain criteria, wherein the criteria is pre-defined or dynamically defined. For example, consider that the initial value of enhancement factor is selected as a prime number closer to 5 times value of total number of low resolution images being processed to generate the high resolution image. For instance, if total number of low resolution images is 10, then initial value of the enhancement factor is selected as 53 (as it is a prime number closer to 5*10=50). This criteria can be changed according to requirements.

Further, for the selected value of the initial value of enhancement factor, sub-pixel shifts along two axes are determined (304), by the enhancement factor selection module 103. Assume that $C_x$ and $C_y$ are the sub-pixel shifts along X and Y axes respectively. Based on the sub-pixel shifts, final enhancement factors ($L_x$ and $L_y$) are generated (306) as:

$$L_x = \text{Next prime number greater than}(\max(C_x)+1) \quad (1)$$

$$L_y = \text{Next prime number greater than}(\max(C_y)+1) \quad (2)$$

Various actions in FIG. 3 can be performed in the same order or in a different order. Further, or one or more of the actions in method 300 can be omitted.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for image processing, comprising:

collecting, via one or more hardware processors, a plurality of low resolution images as input, by an image processing system;

pre-processing the plurality of low resolution images, via the one or more hardware processors, by the image processing system, wherein the pre-processing comprises changing at least one characteristic of each of the plurality of low resolution images with respect to at least one reference image, and wherein the pre-processing further comprises:

estimating rotation of each of the low resolution images with respect to the reference image and rotating the low resolution images to align with the reference image, by calculating a rotation matrix, scaling the low resolution images to match a resolution of a selected image such that all the low resolution images have the same resolution, wherein the selected image is one of the plurality of low resolution images identified to have a highest resolution, and estimating translation using a coarse estimation and a fine estimation, wherein the coarse estimation involves estimating pixel level shift of each image with respect to the reference image at a low resolution scale and selecting a common area between the image and the reference image, and wherein the fine estimation involves sub-pixel level estimation;

enhancing the pre-processed low resolution images based on a plurality of final enhancement factors, via the one or more hardware processors, by the image processing system, wherein the plurality of final enhancement factors are dynamically determined for the plurality of low resolution images; and fusing the plurality of low resolution images using a multi-coset framework to generate a high resolution image, after the enhancement, via the one or more hardware processors, by the image processing system.

2. The method of claim 1, wherein dynamically determining the plurality of final enhancement factors comprises:

selecting an initial value of an enhancement factor, wherein a prime number is selected as the initial value of the enhancement factor, along X-axis and Y-axis of a plane in which the low resolution images are located;

determining sub-pixel shifts along the X and Y axes, for the initial value of the enhancement factor; and generating the plurality of final enhancement factors, based on the determined sub-pixel shifts.

3. The method of claim 2, wherein the initial value of the enhancement factor is selected as prime number closer to five times number of low resolution images being processed.

4. An image processing system, the system comprising:

a processor; and a memory comprising a plurality of instructions, the plurality of instructions configured to cause the processor to:

collect, via one or more hardware processors, a plurality of low resolution images as input, by an Input/Output (I/O) module of the image processing system;

pre-process the plurality of low resolution images, via the one or more hardware processors, wherein the pre-processing comprises changing at least one characteristic of each of the plurality of low resolution images with respect to at least one reference image, and wherein the pre-processing further comprises:

estimating rotation of each of the low resolution images with respect to the reference image and rotating the low resolution images to align with the reference image, by calculating a rotation matrix, scaling the low resolution images to match a resolution of a selected image such that all the low resolution images have the same resolution, wherein the selected image is one of the plurality of low resolution images identified to have a highest resolution, and estimating translation using a coarse estimation and a fine estimation, wherein the coarse estimation involves estimating pixel level shift of each image with respect to the reference image at a low resolution scale and selecting a common area between the image and the reference image, and wherein the fine estimation involves sub-pixel level estimation;

enhance the pre-processed low resolution images based on a plurality of final enhancement factors, via the one or more hardware processors, by an enhancement the image processing system, wherein the plurality of final enhancement factors are dynamically determined for the plurality of low resolution images; and fuse the plurality of low resolution images using a multi-coset framework to generate a high resolution image, after the enhancement.

5. The image processing system of claim 4, wherein the processor is configured to dynamically determine the plurality of final enhancement factors by:

selecting an initial value of an enhancement factor, wherein a prime number is selected as the initial value of the enhancement factor, along X-axis and Y-axis of a plane in which the low resolution images are located;

determining sub-pixel shifts along the X and Y axes, for the initial value of the enhancement factor; and generating the plurality of final enhancement factors, based on the determined sub-pixel shifts.

6. The image processing system of claim 5, wherein the processor is configured to select the initial value of enhancement factor as a prime number closer to five times number of low resolution images being processed.

7. One or more non-transitory machine readable information storage media comprising one or more instructions which when executed by one or more hardware processors causes the one or more hardware processors to perform a method comprising:

collecting, via one or more hardware processors, a plurality of low resolution images as input;

pre-processing the plurality of low resolution images, via the one or more hardware processors, wherein the pre-processing comprises changing at least one characteristic of each of the plurality of low resolution images with respect to at least one reference image, and wherein the pre-processing further comprises:

estimating rotation of each of the low resolution images with respect to the reference image and rotating the low resolution images to align with the reference image, by calculating a rotation matrix, scaling the low resolution images to match a resolution of a selected image such that all the low resolution images have the same resolution, wherein the selected image is one of the plurality of low resolution images identified to have a highest resolution, and estimating translation using a coarse estimation and a fine estimation, wherein the coarse estimation involves estimating pixel level shift of each image with respect to the reference image at a low resolution scale and selecting a common area between the image and the reference image, and wherein the fine estimation involves sub-pixel level estimation;

enhancing the pre-processed low resolution images based on a plurality of final enhancement factors, via the one or more hardware processors, wherein the plurality of final enhancement factors are dynamically determined for the plurality of low resolution images; and fusing the plurality of low resolution images using a multi-coset framework to generate a high resolution image, after the enhancement, via the one or more hardware processors.

8. The one or more non-transitory machine readable information storage media of claim 7, wherein dynamically determining the plurality of final enhancement factors further comprises:

selecting an initial value of an enhancement factor, wherein a prime number is selected as the initial value of the enhancement factor, along X-axis and Y-axis of a plane in which the low resolution images are located;

determining sub-pixel shifts along the X and Y axes, for the initial value of the enhancement factor; and generating the plurality of final enhancement factors, based on the determined sub-pixel shifts.

9. The one or more non-transitory machine readable information storage media of claim 8, wherein selecting the initial value of the enhancement factor comprises selection of a prime number closer to five times number of low resolution images being processed, as the initial value of the enhancement factor.

\* \* \* \* \*